United States Patent [19]
Wolf

[11] 3,859,537
[45] Jan. 7, 1975

[54] INSPECTION SYSTEM FOR WEB MATERIALS

[75] Inventor: William Edward Wolf, Newark, Del.

[73] Assignee: E. I. du Pont de Nemours and Company, Wilmington, Del.

[22] Filed: Oct. 15, 1973

[21] Appl. No.: 406,305

[52] U.S. Cl. ............................... 250/559, 250/563
[51] Int. Cl. .......................................... G01n 21/30
[58] Field of Search .......... 250/206, 559, 562, 563, 250/572, 223; 209/111.7

[56] References Cited
UNITED STATES PATENTS

| | | | |
|---|---|---|---|
| 3,020,033 | 2/1962 | McCreanor | 250/562 |
| 3,051,841 | 8/1962 | Crosfield | 250/559 |
| 3,158,748 | 11/1964 | Laycak | 250/563 |
| 3,340,400 | 9/1967 | Quittner | 250/562 |
| 3,469,104 | 9/1969 | Hector | 250/559 |
| 3,774,041 | 11/1973 | Kaneko | 250/563 |

*Primary Examiner*—James W. Lawrence
*Assistant Examiner*—D. C. Nelms

[57] ABSTRACT

An inspection system for web materials that includes electronic means responsive to means scanning the web for detecting a nonuniform appearance condition of the web. The electronic means provides a low signal-to-noise ratio signal having AC and DC components. A first DC extractor circuit is coupled to said electronic means for extracting the DC component of said signals and providing an AC signal output having a pre-established lower bandwidth limit. A low pass filter is connected to said first DC extractor circuit to permit a preselected band of frequencies from said AC signal output representative of said nonuniform web appearance to pass through a rectifier connected to said filter. The rectifier produces a DC signal from said AC signal output having an RMS value representative of the said nonuniform web appearance. An amplifier conditions the said DC signal representative of said value of nonuniform web appearance, such that said amplifier output characterizes the uniformity in appearance of said web. A long time constant averaging filter is connected to said amplifier for producing a smoothed amplitude time-averaged signal from said DC signal level produced from said AC signal output. The persistence and magnitude of said nonuniform appearance condition is characterized by a change in amplitude of said time-averaged signal representing said uniformity in appearance of said web.

5 Claims, 13 Drawing Figures

INSPECTION SYSTEM FOR WEB MATERIALS

BACKGROUND OF THE INVENTION

This invention relates to an inspection system for detecting unacceptable levels of overall nonuniformity in the appearance of a moving web structure. More particularly, it concerns web inspection apparatus with unusual ability to detect occurrences of persistent nonuniform web appearance conditions such as blotchiness, appearing concurrently with a desired patterned appearance. The system is especially useful for, but is not limited to, monitoring the blotchiness in nonwoven fabrics produced by treating fibrous webs with a high energy liquid stream as disclosed in Evans, U.S. Pat. No. 3,485,706 issued Dec. 23, 1969. The term blotchiness applies to a subtle mottled pattern superimposed on the desired pattern giving an overall undesirable appearance to the product. Typical nonwoven fabrics of this type are characterized by a network or lacelike pattern comprising dense areas of entangled fibers and areas of lesser density or actual holes often arranged in intricate patterns. These patterns induce high signal energy levels which tend to mask signals caused by product blotchiness in photoelectric scanning instrument output signals.

Conventional photoelectric scanning systems fail to differentiate between signals due to intentional patterns and those arising out of undesirable nonuniformities such as basis weight streaks, blotches and poorly formed patterns that have indistinct edges.

The specific shortcomings have included: (1) a failure to adequately remove the DC component of the product pedestal or scan signal prior to discrimination and (2) incomplete processing of the energy content of the blotch signal to permit automatic quality grading of a web material characterized by an inherently low signal to noise ratio signal. Thus, known inspection systems which may operate satisfactorily when used to monitor homogenous sheet materials, are not adequate to characterize the aforementioned undesirable nonuniform appearance (e.g., blotchiness) characteristics of fibrous nonwoven and patterned materials.

SUMMARY OF THE INVENTION

The inspection system of the invention comprises a source producing a collimated beam of radiation, a means for traversing this beam in a first plane, apparatus for moving the web-like product under inspection in a second plane perpendicular to the first plane, radiation collecting and transducing apparatus arranged to detect that portion of the beam of radiation which is transmitted through or reflected from the web, and novel electronic analyzing and control circuitry arranged to condition, analyze and compensate the electrical signal from the photoelectric transducer and provide an output signal relating to the level of web appearance uniformity for analog recording and comparison in order to provide means for sounding an alarm upon the occurrence of appearance nonuniformity levels which are unacceptable. The system includes in addition, a photocell located in the path of the beam of radiation just ahead of its traverse across the web. The output of this photocell is connected to provide (1) an optional gating signal for the product signal conditioning and compensating circuitry and (2) an alarm in the event of a radiation malfunction. The signal compensating, analyzing and conditioning circuitry includes first a gate forming circuit arranged to provide synchronized gating pulses according to the times of occurrence of the primary photodetector signals. A first DC extractor circuit, controlled by the gating signal, is designed to remove the DC component from the primary photodetector pedestal signal and act as a high pass filter, but at the same time eliminate the transient signal spikes which would ordinarily appear at the beginning and end of the filtered signal wave form. An active low pass filter having a pre-established frequency cutoff and gain corresponding to the type of web product to be inspected is used to filter the total AC product signal in such a way that only those signals characteristic of nonuniformities in the particular product under examination are passed on to succeeding inspector circuitry.

A second Dc extractor under control of the same gate forming circuitry is next provided in order to compensate for any signal drift or offset primarily caused by the effects of temperature variations on the preceding operational amplifiers. A precision rectifier, a selectable gain amplifier and finally a long time constant averaging filter are provided in order to yield a time-averaged DC signal indicative of the average energy level of the characteristic noise signal in the pre-established frequency band based on an averaging period of several scans of the radiation beam. An analog recorder and a comparator circuit with alarm output produce product grading information from the aforementioned time-averaged DC signal. Auxiliary equipment operated from the photocell monitors the radiation beam intensity and provides an alarm when the radiation beam power fails or falls below a minimum acceptable level. Auxiliary calibrated noise and gate generators are included to provide means for periodically calibrating the signal compensating, analyzing and conditioning circuitry.

BRIEF DESCRIPTION OF THE DRAWINGS

FIG. 6F' is a typical recorder trace of web uniformity;

DETAILED DESCRIPTION OF THE PREFERRED EMBODIMENT

Figure 1:
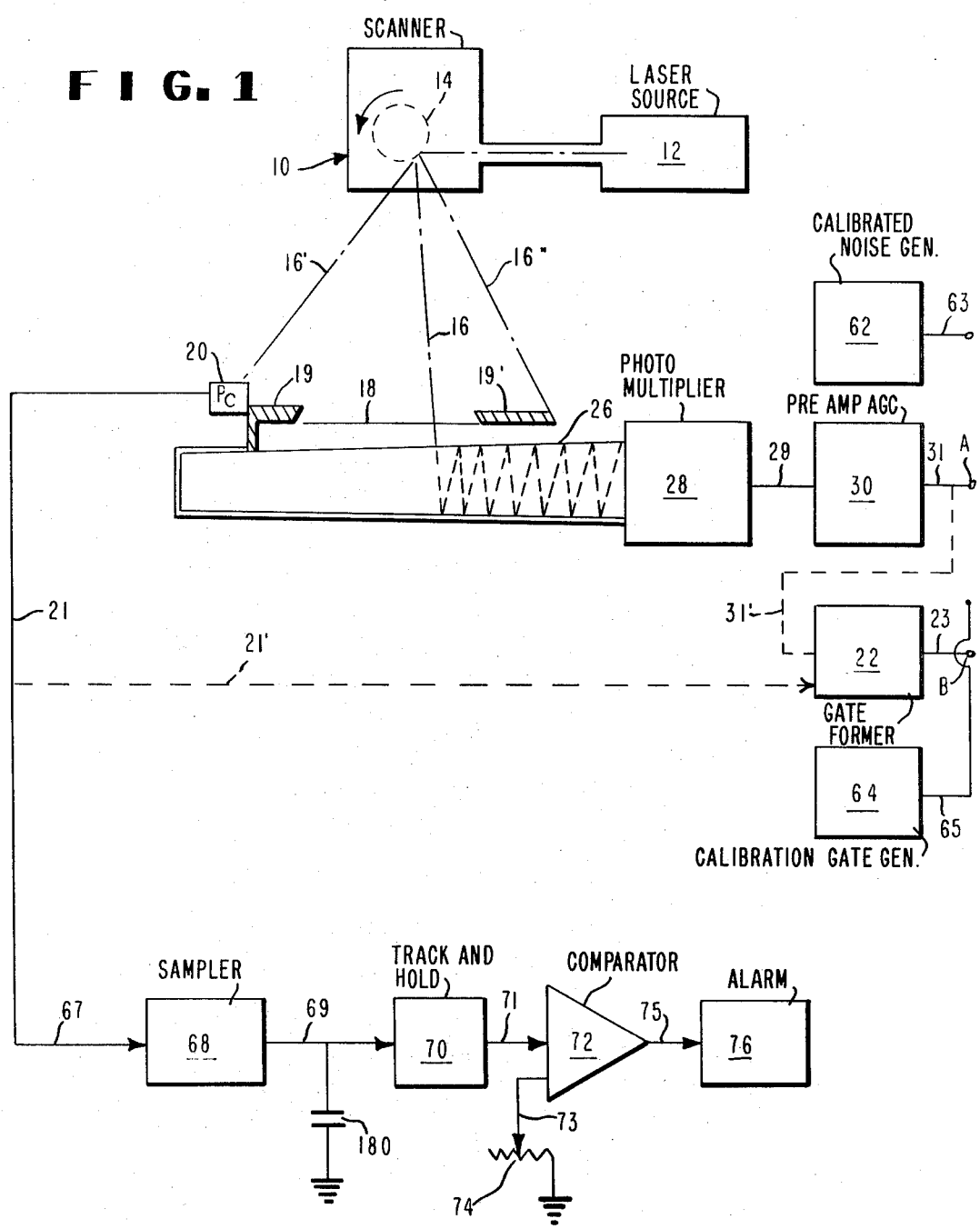
FIGS. 1 and 2 combined are a block diagram of the web inspection system.
Figure 2:
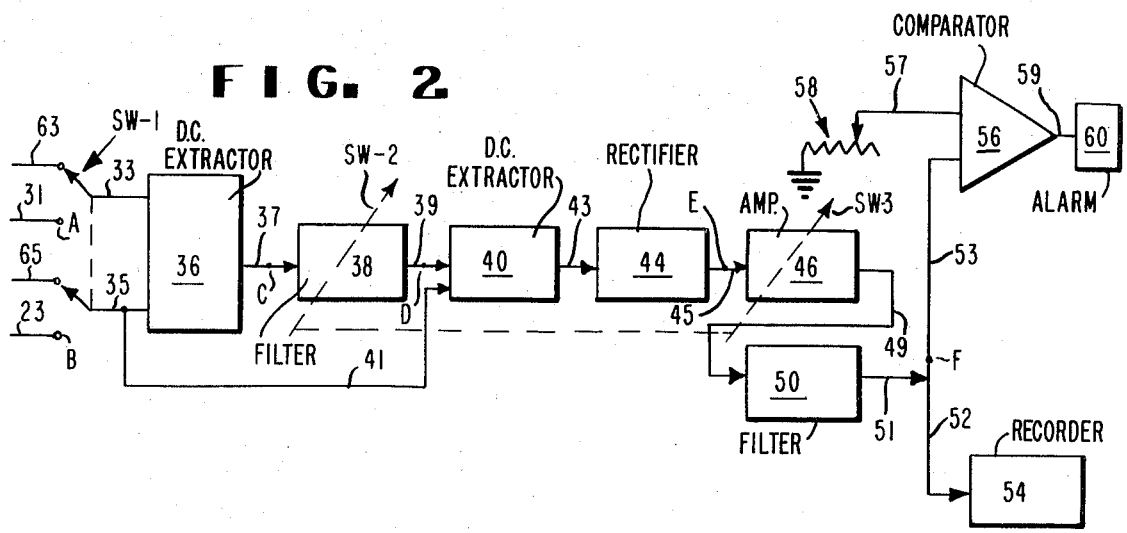

Turning first to FIGS. 1 and 2, the inspection system of this invention comprises first a mechano-optical flying spot scanning system designated generally as 10. This includes a laser source 12 which directs radiation toward a multi-faceted rotating mirror 14 and associated beam-forming optics not shown, all of which provides a highly collimated beam of radiation 16 which is scanned in the plane as indicated by broken lines 16', 16''. A running product web 18 is moved by mechanism not shown in a plane substantially perpendicular to the scanning plane containing beam limits 16', 16'' and the relative speeds of web motion and scanning rate are adjusted to ensure successive scans overlap sufficiently for complete product inspection. a 5MW He-Ne laser is used with optics to give a spot size on the web nominally 1.6 mm. XD (cross machine direction) and 6.4 mm. MD (machine direction). This light beam is scanned by an octagonal mirror rotating at 7,200 rpm. Masks 19, 19' prevent the radiation from passing downward past the edges of the web 18, which would cause improper behavior of the succeeding automatic gain control system.

A photocell 20 is placed as shown adjacent mask 19 and arranged to receive the beam of radiation at the start of each scan. Output of transducer 20 is connected over line 21 to line 21' and thence to gate-forming circuit 22. Output line 21 also extends to alarm circuitry to be described later. Line 21' is shown in dashed form because an alternate embodiment eliminates this line, wherein a portion of the preamplifier — AGC circuit 30 output signal passes over dashed line 31' to operate circuit 22.

A radiation conducting rod 26 extending across the full width of the web is placed immediately below the web in order to receive radiation transmitted through the web from the scanning beam and conduct this radiation to a photomultiplier (PM) receiver 28. A similar rod not shown is placed above the web for the optional embodiment which employs the reflection mode. The output of PM 28 is connected over line 29 to a preamplifier-AGC circuit 30. Automatic gain control (AGC) is needed to maintain the product pedestal signal at substantially constant average level over many successive scans of the radiation beam. The output of the preamplifier — AGC circuit 30 is called the product signal and is typically of the form shown in FIG. 6A. This output is connected over line 31 to contact A of test-operate double pole single throw (DPST) push button switch sw–1, one wiper of which is connected to a first input line 33 of DC extractor circuit 36. Output line 23 from gate forming circuit 22 is connected to contact B of switch SW–1 and the second wiper of this switch is connected over line 35 to the gate input terminal of DC extractor circuit 36. Switch SW–1 is arranged so that when the first wiper contacts terminal A, the second wiper simultaneously contacts terminal B. Output of extractor circuit 36 is connected over line 37 to a selectable gain active low pass filter circuit 38. Circuits 36 and 38 are shown in more detail in FIGS. 3 and 4, respectively. The output of filter circuit 38 is connected over line 39 to a second DC extractor circuit 40 which has its gate input also connected to line 35 over line 41. The output of this second extractor circuit 40 is connected over line 43 to a precision rectifier circuit 44, (which will be described later by reference to FIG. 5), which in turn is connected over line 45 to an amplifier (with selective bias) 46. The bias selection switch SW–3 is ganged to the gain selector switch SW–2 of low pass filter circuit 38 indicated by the dashed line connecting circuits 38 and 46 in FIG. 2.

The output of amplifier 46 is connected over line 49 to a time-averaging filter circuit 50 and thence over line 51 first to line 52 and the input terminal of analog recorder 54 and secondly, to line 53 and the first input terminal of comparator 56. The second input terminal of comparator 56 is connected over line 57 to a potentiometer 58. The output of comparator 56 is connected over line 59 to alarm circuit 60.

In order to provide calibration of the apparatus, calibration noise generator 62 is connected over line 63 to a second upper terminal of switch SW–1 corresponding to terminal A and a calibration gate generator 64 is connected over line 65 to a second contact of switch SW–1 corresponding to lower contact B so that when switch SW–1 is in its upper position circuit 62 is connected to line 33 and circuit 64 to line 35.

Further, auxiliary circuitry is provided by a line 67 which extends from output line 21 of photocell 20 and provides input to a sampler circuit 68, which in turn is connected over line 69 to track hold circuit 70 and thence over line 71 to comparator 72 which has an additional input line 73 extending from potentiometer 74. A capacitor 180 is connected from line 69 to ground. Output of comparator 72 is connected over line 75 to alarm circuit 76, thus, completing the basic circuit elements of the preferred embodiment.

Figure 3:
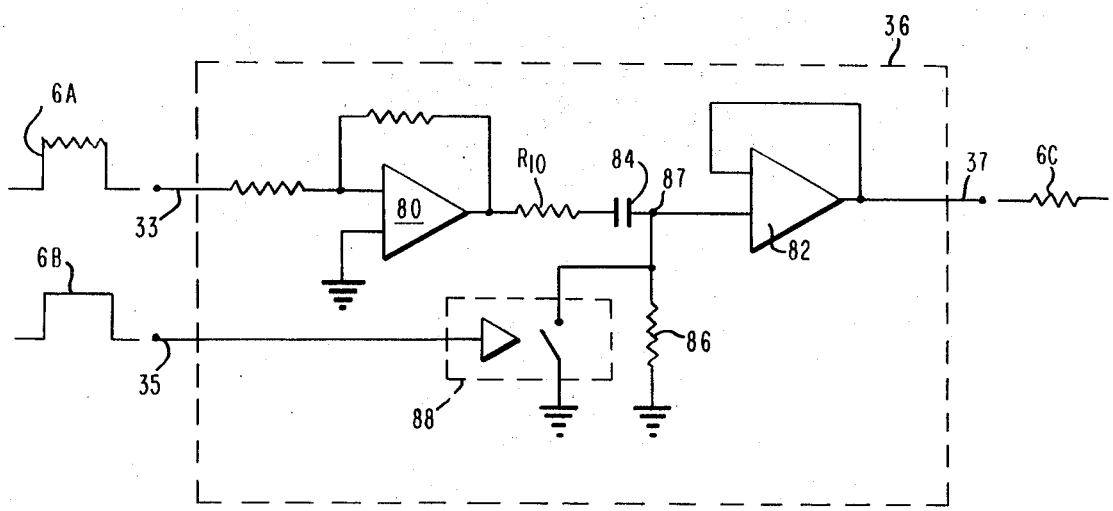
FIG. 3 is a schematic diagram of a DC extractor circuit typical of the two extractor circuit elements of this invention.

An important feature of this invention is the inclusion of DC extractor circuit 36 which is shown in more detail in FIG. 3. This circuit includes an amplifier 80 (e.g., Philbrick No. 1,321) coupled to a follower circuit 82 (e.g., Philbrick No. 1,322) by means of a charging circuit including resistor $R_{10}$, and capacitor 84 and resistor 86 connected between the output terminal 87 of capacitor 84 and ground. Connected around resistor 86 in such a way as to provide a shunt to ground when the switch is closed in analog switch 88, such as Crystalonics Type CAG-30, whose gate input terminal is connected to line 35 from gate generator circuit 22. The structure and operation of the second DC extractor circuit 40 is not given in detail since it essentially duplicates that of circuit 36.

Figure 6:
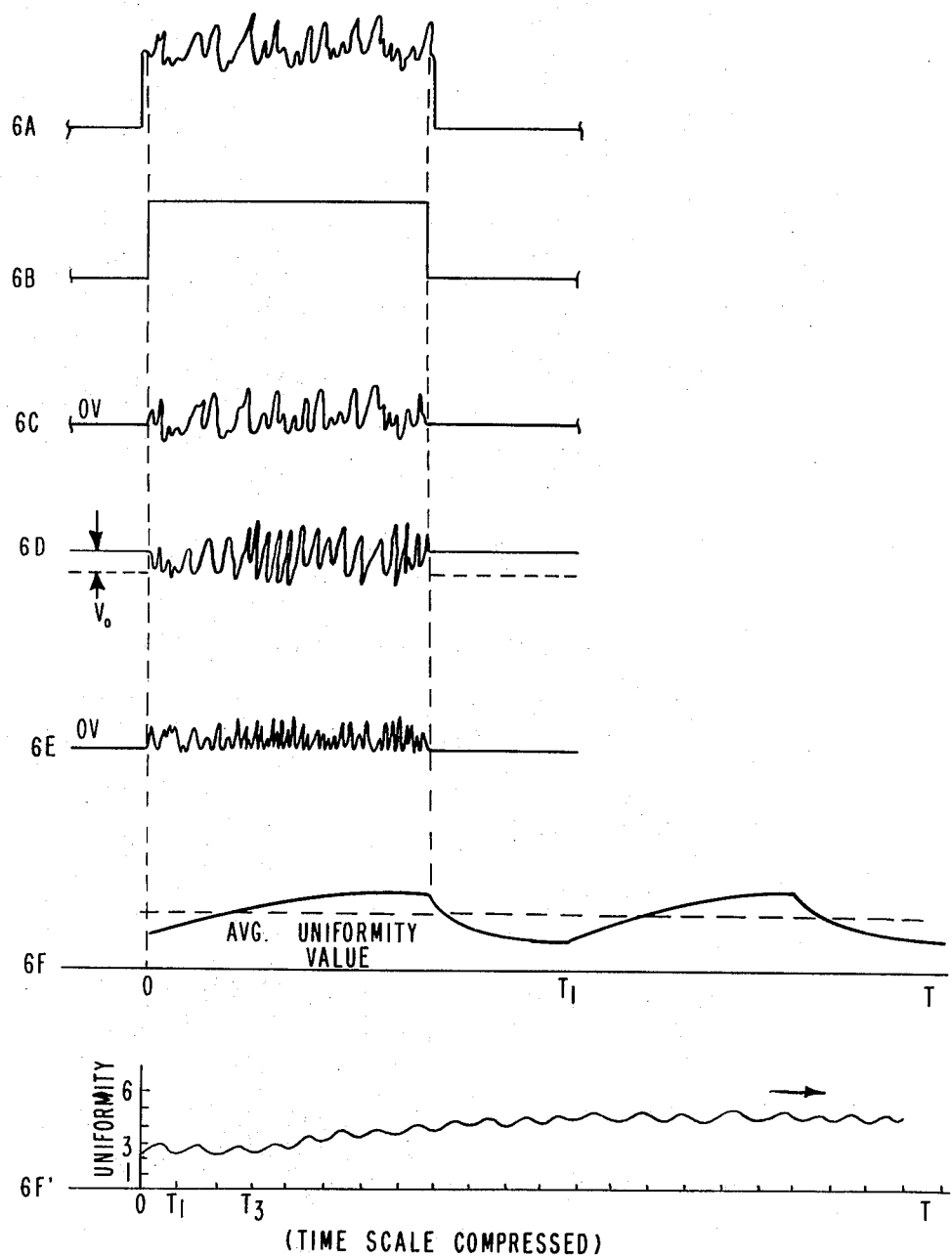
FIGS. 6 A–F are representations of the signal wave forms existing at particular points in this circuitry of the inspection system labeled in FIG. 1 with the same identifying capital letters A through F.

DC extractor 36 provides means for removing the DC component from the low signal-to-noise ratio product pedestal signal shown in FIG. 6A without introducing distortion and spikes at the extremities of the reduced scan signal caused by differentiating the leading and trailing edges of the pedestal signal. The existence of such spikes would introduce unwanted signals to the further circuitry and in some cases cause erroneous inspection results, as would be the case were a conventional high pass filter circuit to be used instead. In circuit 36 (and likewise circuit 40) amplifier 80 amplifies the product pedestal signal of FIG. 6A and through resistor $R_{10}$, impresses this on capacitor 84, the combination acting as a high pass filter. The signal spike produced by differentiating the leading edge of the amplified signal FIG. 6A by the action of capacitor 84 bypasses resistor 86 to ground through closed analog switch 88 instead of on a path through the high input impedance of follower 82. The gate signal (FIG. 6B) input over line 35 to switch 88 is synchronized and timed so that it causes the normally closed switch 88 to open rapidly in timed relationship at the instant the spike condition has subsided. The synchronization and timing of the gating signal (FIG. 6B) relative to the product pedestal (FIG. 6A) is shown with the aid of vertical dashed lines in FIG. 6. As long as switch 88 remains open the AC components of the product signal (FIG. 6A) will appear at the input terminal of follower 82 so as to produce the purely AC output signal (FIG. 6C) on line 37. The charge accummulated by capacitor 84 during the period switch 88 was closed effectively blocks the DC component of the product pedestal signal (FIG. 6A) from appearing in the follower 82 output signal (FIG. 6C). Gating signal (FIG. 6B) on line 35 is timed to terminate just prior to the arrival of the trailing edge of the product signal (FIG. 6A), thereby closing switch 88 to provide, again, a low impedance discharge path to ground and re-establish the zero volt level for follower 82.

Figure 4:
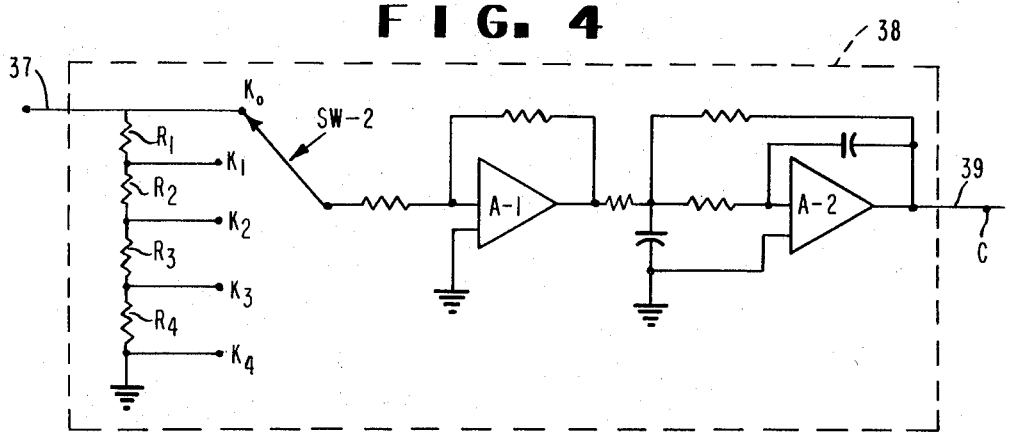
FIG. 4 is a schematic diagram of the product selectable gain active low pass filter circuit.

After the DC component is removed from the product signal and the signal shown in FIG. 6C is produced over line 37, the pattern related spectral components of the product signal are attenuated by a selectable gain low pass active filter circuit 38 having selectable gain characteristics corresponding to the individual types of product patterns to be inspected. Further details of circuit 38 are shown in FIG. 4. An array of resistors such as $R_1$, $R_2$, $R_3$ and $R_4$ are connected with switch contacts $k_0$-$k_4$ of selector switch SW–2 which feeds two operational amplifiers A–1 and A–2. These operational amplifiers are, for example, Type AD–503–KH of Analog Devices, Inc. The first amplifier is used to provide selectable voltage gain for the input signal whereas the second forms a low pass filter circuit providing the high frequency cut off for the high pass filter previously mentioned in the description of FIG. 3. The values of resistors $R_1$–$R_4$, etc. are established to provide a selection of gain characteristics for this filter which enable use of the circuit for a variety of product patterns such as the various lacelike patterns mentioned above by reference to Evans, U.S. PAT. No. 3,485,706.

The output of filter circuit 38 is an AC signal which contains components of the product signal correlating with product nonuniformity. This signal then passes to a precision rectifier 44 shown in FIG. 5 after it has passed through a second DC extractor 40 (FIG. 2). This second DC extractor provides for the elimination of any small DC offset which may appear in the signal as a result of the effects of temperature changes in the solid state components of the preceding active filter circuitry. Thus, as shown in FIG. 6D, the small DC offset $V_0$ is eliminated by extractor 40 to provide a zero mean AC signal before it is rectified by precision rectifier 44 to produce the signal shown in FIG. 6E.

Figure 5:
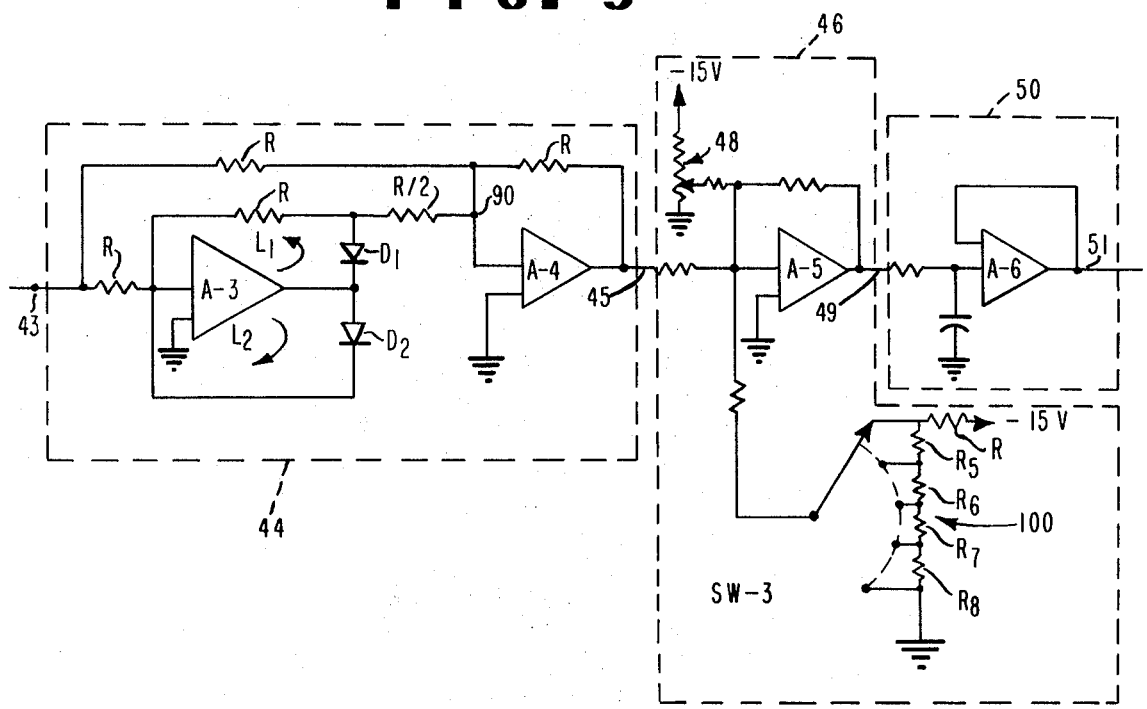
FIG. 5 is a schematic circuit diagram of the precision rectifier and associated selectable gain amplifier and filter circuits.

The precision rectifier 44 is used to produce an ideal full wave rectified signal output when the speed of response of a simple differential operational amplifier would be inadequate to cope with the high speed zero crossing detection requirements for a signal such as that shown in FIG. 6D. FIG. 5 shows the detail of this circuit comprising a first operational amplifier A–3, such as an AD–503–KH, with one feedback loop, $L_1$, containing a resistor of value R and a first diode $D_1$ and a second feedback loop $L_2$ containing diode $D_2$. A second operational amplifier A–4, such as an AD–50-3–KH, has a single feedback path through a resistor of value R and is connected in series with amplifier A–3 by two distinct input paths provided by resistors of value R and R/2 rspectively, which join at location 90. The instant the AC signal on line 43 becomes negative, the output of amplifier A–3 jumps to a positive value by an amount equal to the small voltage drop across conducting diode $D_2$, whereas diode $D_1$ is nonconducting. Amplifier A–4 simultaneously inverts this negative input signal input to produce a positive value on line 45. At the instant the signal on line 43 swings positive, both amplifier A–3, and A–4 invert the signal, but the negative output of amplifier A–3 is added to the positive input signal of amplifier A–4 at location 90 which produces a net positive output on line 45 equal to the absolute value of the signal on line 43. Thus, any forward voltage drop related to the diode action is cancelled out before the rectified signal FIG. 6E passes on line 45 to the selectable gain amplifier circuit 46.

The amplifier circuit 46 is seen to comprise a first operational amplifier A–5 such as AD506K. The input of A–5 is connected through a resistor to line 45 and in addition is connected through another resistor to the wiper arm of a switch SW–3, the contacts of which are connected to a stepped voltage supply marked generally as 100. This comprises a —15 volt power supply (not shown) connected to one end of a series of resistors $R_5$, $R_6$, $R_7$ and $R_8$ and thence to ground. Contacts of switch SW—3 are connected to the —15 volt supply through resistor R or to the lines between the successive resistors, thus, providing a stepped voltage supply to the input of operational amplifier A–5. This selectable bias provides the appropriate instrument span for the alarm and recorder means for the particular product inspected. In the preferred embodiment, the wiper of switch SW–3 is ganged with the wiper of switch SW–2 of the earlier described product selectable gain low pass filter 38 of FIG. 4. Thus, when a known type of product is selected for uniformity characterization by the inspection system, the setting to the known type of product by means of switch Sw–2 also sets the selectable bias voltage applied to amplifier 46 through the action of SW–3. A resistive feedback loop is connected around the input and output terminals of amplifier A–5 and a variable voltage supply comprising a DC source and potentiometer 48 is connected to this loop at the input end, wherein potentiometer 48 is used to adjust the span of response of the amplifier against a known calibration signal to be described later.

Time-averaging filter circuit 50 is connected to amplifier 46 through line 49 and comprises an RC low pass filter and follower circuit containing operational amplifier A–6 which is, for example, an AD–503–K. The output of filter circuit 50 then travels to associated comparator and recorder circuits over line 51.

In operation, the system can best be described by reference to FIGS. 1, 2 and 6. After regulation and amplification by preamplifier - AGC circuit 30, and with switch SW–1 in position A-B, the product pedestal signal FIG. 6A produced by the scan of laser beam 16 across the moving web 18, and conveyed by light conducting rod 26 to PM 28, passes to the DC extractor circuit 36. A beginning-of-scan signal, produced by the radiation beam passing over photocell 20, activates gating circuit 22, which forms a gate signal FIG. 6B timed to coincide with the low signal-to-noise ratio product pedestal signal. This gate signal operates the DC extractor circuit 36 to produce the undistorted Ac output signal FIG. 6C.

The photocell 20 output simultaneously travels to sampler circuit 68 which extracts the peak value of the transduced optical to electrical signal. This value is held by capacitor 180 to become an input to track-hold circuit 70. should a loss of beam power cause a decrease in potential across capacitor 180 and reduce the amplitude of the output signal from track-hold circuit 70, comparator 72 produces a signal to sound an alarm 76, provided the track-hold circuit 70 output signal value falls below the pre-established threshold set by potentiometer 74. Alarm 76 alerts the operator instantaneously to a deterioration in scan illumination.

DC extractor circuit 36 output signal FIG. 6C, containing both product background and nonuniformity high frequency spectral components, travels from the output of the first DC extractor circuit 36 to selectable gain product low pass filter 38 which with the high pass filtering achieved by the preceding stage 36, passes just the band of frequencies associated with the particular web nonuniformity condition, producing the signal shown in FIG. 6D. A second DC extractor circuit 40 is used to remove the DC offset, $V_O$, contained in the signal FIG. 6D before the signal is rectified by precision rectifier 44 to produce output signal 6E. The RMS value of this latter signal represents the instantaneous spectral power contained in a nonuniformity signal pass band in the course of a single scan over the examined product web. The rectified signal FIG. 6E next passes to selectable bias amplifier 46 which inverts the biased rectified signal and produces a scaled amplitude output signal similar to FIG. 6E. To obtain a representative measure of blotchiness, persistent over some length of the web, time-averaging filter circuit 50 produces a smooth output signal FIG. 6F from the bursts of rectified energy shown in FIG. 6E by time-averaging the RMS values over many scans. A continuous recording of the degree of blotchiness is produced by recorder 54 as the values of filter 50 output are plotted (FIG. 6F'). In addition, an alarm 60 sounds when filter 50 output level exceeds the threshold level set on potentiometer 58 causing comparator 56 to produce a trigger signal on line 59.

Figure 7:
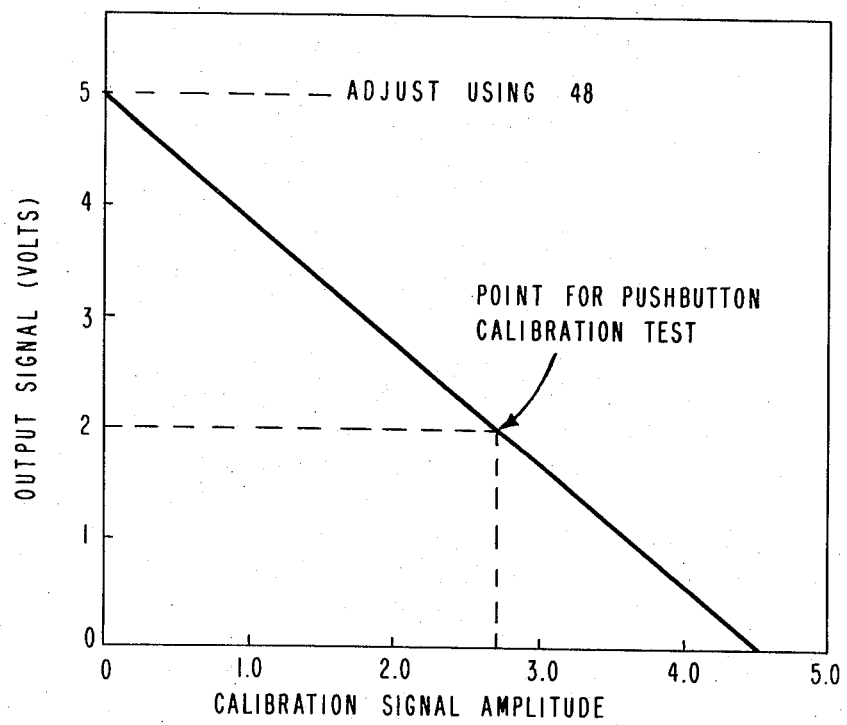
FIG. 7 is a typical calibration curve for the analyzer.

In order to ensure accurate and consistent operation of the electronic circuitry, switch SW-1 is occasionally turned to the position shown, thereby replacing the preamplifier - AGC circuit 30 and gate forming network 22 outputs by those produced by a known calibrated noise source 62 and calibrated gate generator 64, respectively. FIG. 7 shows a typical calibration curve of the noise source signal amplitude plotted against the time-averaged signal value read at the output of time-averaging filter 50. The calibrated noise generator 62 signal amplitude setting is normally fixed in a position which will result in a convenient voltage reading on line 51, such as depicted by the dashed lines in the figure. Potentiometer 48 is then used to adjust the time-averaging filter 50 output signal value to read the calibration chart value should a deviation occur.

This nonuniformity inspection system solves the problem of distinguishing and separating the high level signals caused by a photoelectric inspectiion device in its scan over intentional patterned surface configurations from the simultaneously appearing low level signals associated with ill-defined undesirable irregularieis irregularities as blotches in this patterned surface.

Application of the inspection system of this invention to a series of product specimens which in turn had been subjectively visually rated by a panel of experts has demonstrated that an 8 percent correlation between the results of the two methods can be achieved. An additional advantage is that the instant invention allows rapid on-line inspection speeds for detecting nonuniformities in a wide variety of nonuniform web products moving at high machine direction velocitiess.

What is claimed is:

1. In an inspection system for web materials that includes electronic means responsive to means scanning the web for detecting a nonuniform appearance condition of the web, said electronic means providing a low signal-to-noise ratio signal having AC and DC components, the improvement comprising: a first DC extractor circuit coupled to said electronic means for extracting the DC component of said signal and providing an AC signal output; a low pass filter connected to said fist DC extractor circuit for permitting a preselected band of frequencies from said AC signal output representative of said nonuniform web appearance to pass through; a rectifier connected to said low pass filter, said rectifier producing a DC signal from said AC signal output, said DC signal having an RMS value representative of the said nonuniform web appearance; an averaging filter connected to said rectifier for producing a time-averaged signal from said DC signal level produced from said AC signal output, the persistence and magnitude of said nonuniform appearance condition being characterized by a change in amplitude of said time-averaged signal; and means for recording said time-averaged signal and signalling when said time-averaged signal exceeds a preselected threshold value.

2. The system defined in claim 1, including a second DC extractor circuit connected between said filter and said rectifier.

3. The system as defined in claim 2, each of said first and second DC extractor circuits comprising: an amplifier; a follower; a charging circuit connected between the amplifier and follower, said charging circuit including a capacitor connected between the output of the amplifier and the input of the follower; a resistor connected between the input of the follower and ground; and an electronic switch connected from the input of the follower to ground, said switch being operated in timed relationship with said low signal-to-noise ratio signal.

4. The system as defined in claim 1, said system being a flying spot inspection system for web materials that includes a radiation source, a means for traversing a beam of radiation from said source in a scan across the web, said electronic means being responsive to said beam of radiation in the transmission or reflection mode with respect to said web for detecting a nonuniform appearance condition of the web.

5. The system as defined in claim 1, including a selectable bias amplifier connected between said rectifier and said averaging filter.

* * * * *

PO-1050
(5/69)

UNITED STATES PATENT OFFICE
CERTIFICATE OF CORRECTION

Patent No. 3,859,537          Dated January 7, 1975

Inventor(s) William Edward Wolf

It is certified that error appears in the above-identified patent and that said Letters Patent are hereby corrected as shown below:

Col. 2, line 16, capitalize c in "Dc".

Col. 3, line 5, capitalize "a"; line 40, capitalize sw in "sw-1".

Col. 6, line 14, should read --...resistors R, $R_5$, $R_6$, $R_7$ and $R_8$...--; line 27, capitalize w in "Sw-2"; line 55, capitalize c in "Ac".

Col. 7, line 52, delete "irregularieis"; line 53, insert "such" after --irregularities--; line 57, change "8" to read --80--.

Col. 8, line 5, velocities is misspelled; line 15, change "fist" to read --first--.

Signed and sealed this 29th day of April 1975.

(SEAL)
Attest:

RUTH C. MASON
Attesting Officer

C. MARSHALL DANN
Commissioner of Patents
and Trademarks